Jan. 30, 1968 R. A. BRUCE 3,366,949
APPARATUS FOR DECODING LOGARITHMICALLY COMPANDED CODE WORDS
Filed Oct. 7, 1964 3 Sheets-Sheet 1

INVENTOR
R. A. BRUCE
BY
ATTORNEY 3,366,949

APPARATUS FOR DECODING LOGARITHMICALLY COMPANDED CODE WORDS

Raymond A. Bruce, Summit, N.J., assignor to Bell Telephone Laboratories, Incorporated, New York, N.Y., a corporation of New York Filed Oct. 7, 1964, Ser. No. 402,214
4 Claims. (Cl. 340—347)

ABSTRACT OF THE DISCLOSURE

Decoding apparatus comprising stages connected in tandem with the analog output of one stage connected to the analog input to the succeeding stage and each stage connected to receive one digit of a code word. Each stage comprises apparatus for multiplying the input signal by one or the other of two multiplying factors and for adding one or the other of two reference signals both operations being governed by whether the digit applied to a stage is a "1" or a "0."

This invention relates to digital information processing systems, and, more particularly, although in its broader aspects not exclusively, to digital-to-analog conversion apparatus of the type used in pulse code modulation (PCM) systems.

Like any other type of communication link, the function of the PCM system is to produce at the system's output a replica of that function of time or "message" which was applied to the distant input. Unlike most other transmission arrangements, however, a PCM system does not continuously transmit the message signal. Rather, since the message signal can assume only a limited number of independent amplitude values in a given unit of time, only these "sample" values are transmitted. Instead of sending actual sample amplitudes, however, a coder at the transmitting end generates a pulse code binary number which represents that discrete amplitude level which, out of an array of such levels, is nearest to the amplitude of the instantaneous sample.

This process of representing a bounded continuum of signal values by a finite number of discrete values is called "quantization." Because the discrete values transmitted are only approximations of the actual sample amplitudes, deliberate errors are imparted to the signal. These errors give rise to "qauntizing noise," a significant source of PCM signal impairment.

Various methods of reducing the magnitude of quantization noise have been suggested. The first and perhaps the most obvious of these is to increase the number of the representative discrete values (usually called "quantization levels") to provide finer-grained approximations of the sample amplitudes. This necessarily involves an increase in the number of digits in the transmitted pulse code binary number, however, and accordingly increases the bandwidth of the PCM signal. Alternatively, a more complete description of the message signal may be obtained by increasing the sampling rate—although this approach also suffers the disadvantage of increased bandwidth.

A third and more advantageous method for reducing quantizing noise is known as "companding." According to this scheme, the spacing between adjacent quantization levels is made dependent upon the position of those levels within the over-all array of levels. By providing more closely spaced levels for weaker signals and spreading out the levels for stronger signals, the amount of quantization noise added to a speech signal may be significantly reduced. This is achieved without increasing the total number of levels and, consequently, without increasing the bandwidth of the transmitted signal. For a thorough discussion of the theory of companding, see the article, "Instantaneous Companding of Quantized Signals," by Bernard Smith which appeared in volume 36 of the Bell System Technical Journal, pages 653 to 709 (1957).

Companding is normally accomplished by the sequential operations of "compression," linear coding, linear decoding, and "expansion." Compression is produced by a transducer which amplifies weak signals more than strong signals. As a result, the "compressed" signal, when fed to a linear encoder using equally spaced quantizing levels, is converted into a pluse code binary number identical to that which would be generated by a coder having the unequally spaced levels described above. At the receiving end of the system, the decoded signal is "expanded" by a second transducer which preferentially amplifies the stronger signals. The two transducers must, of course, have precisely inverse characteristics for the over-all system to be linear. While effective transducers have been developed which use the nonlinear characteristics of semiconductor devices, these networks have often proven to be temperature sensitive, subject to aging effects, and comparatively expensive.

It is accordingly a principal object of the present invention to achieve companding within the coder and decoder themselves without resorting to external transducers.

It is a further and related object of the present invention to provide a highly stable companding characteristic which is substantially unaffected by aging or changes in ambient temperature.

It has been found that if a logarithmic relationship between the position and the spacing of the quantizing levels is employed, analysis permits the selection of that degree of companding which, for a particular operating environment, gives optimum improvement in quantizing noise. In order to achieve logarithmic companding, many prior art schemes have resorted to piece-wise linear, hyperbolic and parabolic approximations. Other arrangements, while they have been capable of true logarithmic companding, have required the use of large numbers of very accurate, high speed switches and have proven to be both complex and costly.

It is, therefore, a still further object of the present invention to accomplish true logarithmic companding in a simplified manner.

In a principal aspect, the present invention takes the form of an improved sequential decoding arrangement of the same general type as that disclosed in U.S. Patent 3,145,377, which issued to F. A. Saal on Aug. 18, 1964. A plurality of similar decoding stages are employed, each of which has an analog input, an analog output, and a digit input. The stages are connected in tandem, the analog output of the one stage being connected to the analog input of the next, and so on. The decoded sample amplitude appears at the analog output of the last stage. Each of these stages is characterized in that the amplitude of the signal delivered to its analog output is functionally related to the signal amplitude applied to its analog input by a first predetermined relationship whenever a "0" is applied to its digit input and by a second predetermined relationship whenever a "1" is applied to its digit input. To decode an $n$-digit code word, $n$ stages may be connected in tandem to subject an initial value signal to a sequence of $n$ signal translation operations, the character of each operation being respectively dependent upon each of the $n$ digits in the code word (in order of increasing digit significance).

In decoding conventional binary code groups by means of the scheme outlined above, it has been the practice to employ decoding stages which are adapted to translate an input signal amplitude $E_{in}$ into an output signal amplitude $E_{out}$ in accordance with the following relation:

$$E_{out}=\tfrac{1}{2}E_{in}+(d)(A)$$

In this case, "$d$" is the digit value ("0" or "1") and "A" is a selected constant. As may be seen by the relation above, the output signal from each stage in the conventional sequential decoder is formed by multiplying the input signal by a fixed factor ½, and, when the input digit is a "1," adding a fixed voltage "A" to the product.

The present invention contemplates the use of a different set of transfer characteristics for the stages to directly decode companded code words without the use of an auxiliary expansion transducers.

In the decoder contemplated by the present invention at least some of the stages are adapted to translate the input signal $E_{in}$, into an output signal $E_{out}$, in accordance with the relation $$E_{out}=G_1E_{in}$$

whenever the input digit is a first symbol and in accordance with the relation $$E_{out}=G_2E_{in}+G_1V$$

whenever the input digit is a second symbol. Companded decoding is made possible by arranging $G_1$ to have the same sign but to be substantially smaller than $G_2$. In the equations, "V" is the maximum amplitude assumed by $E_{in}$. By judicious selection of the quantities $G_1$ and $G_2$ for each of the several stages in the decoder, instantaneous translation of logarithmically companded code words may be achieved.

According to a further aspect of the invention, novel stage circuitry is employed to carry out the sequential logarithmic decoding scheme described above. Each stage comprises a high gain amplifier in combination with a digit responsive gain control network which utilizes precision resistors to precisely fix the stage gain (or attenuation). Means are also provided for adding a constant value signal (whose magnitude is also determined by a precision resistor) to the output signal is response to the input digit value.

These and other features, objects and advantages of the invention will become more apparent through a consideration of the following detailed description of a specific embodiment of the invention. In the drawings, FIGS. 1 through 5 illustrate the manner in which companding, as contemplated by the present invention, reduces quantization noise while the remaining FIGS. 6 through 11 relate to the novel companding scheme according to the present invention. More specifically, FIG. 1 shows the probability distribution of a typical speech signal;

FIG. 2 graphically illustrates the conventional linear code representations of a signal amplitude;

Figure 6:
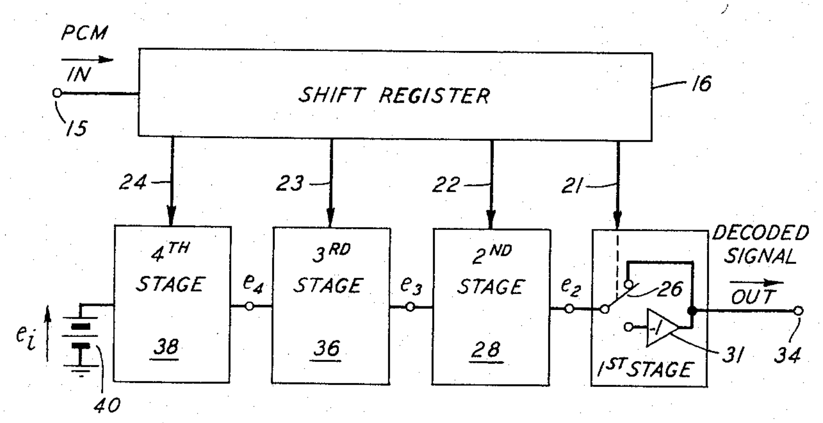
FIG. 6 depicts a sequential decoder according to the present invention which is capable of translating logarithmically companded code words into their analog equivalents.
Figure 7:
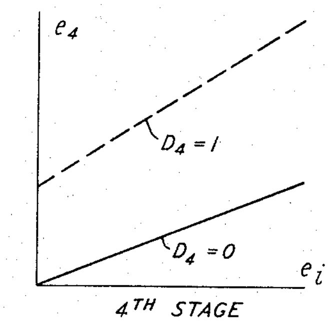
Figure 8:
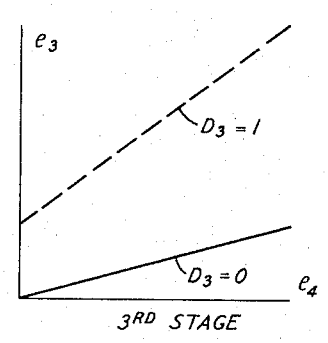
Figure 9:
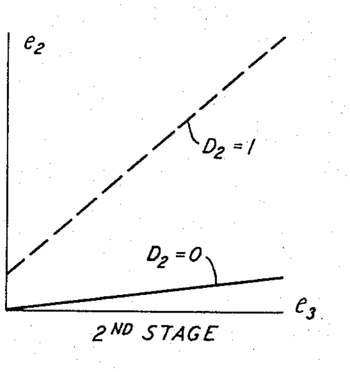
Figure 10:
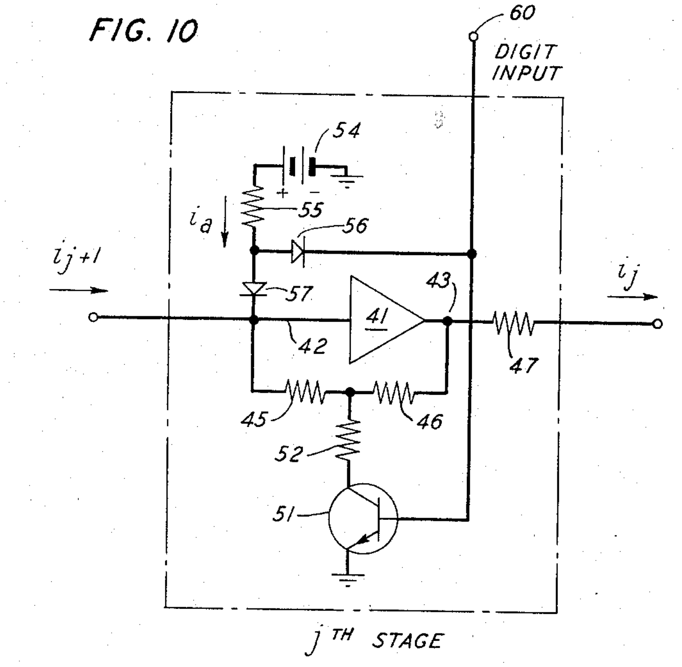
Figure 11:
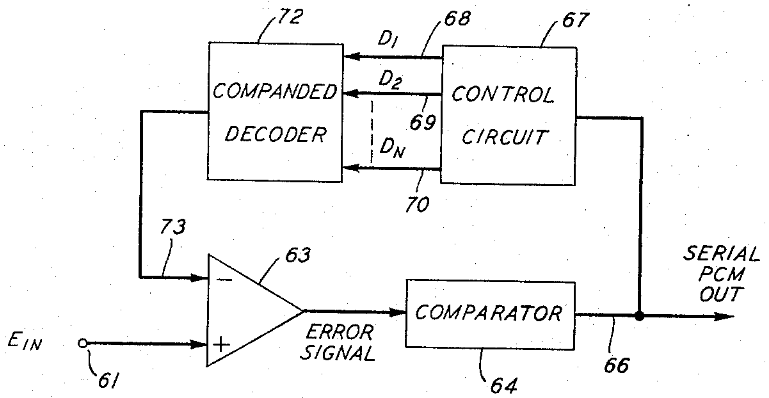

FIGS. 7 through 9 show typical transfer characteristics for the stages 38, 36 and 28 of FIG. 6, respectively;

FIG. 10 shows a novel stage circuit which may be used to instrument the decoding scheme according to the present invention; and, FIG. 11 illustrates the manner in which a companded decoder, as contemplated by the present invention, may be used in combination with further apparatus to form a logarithmically companded encoder.

As discussed earlier, the process of quantization is a process of approximation, and, accordingly, gives rise to errors. In PCM, these errors cause noise whose severity is related to both the number and size of the errors. The principle of companding is based upon the realization that the total noise may be minimized by providing finer-grained approximation for those amplitudes at which the signal is most likely to exist—and rougher approximations for those amplitudes at which the signal exists only seldomly.

Figure 1:
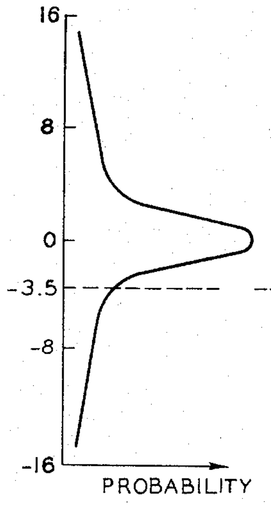

If normal human speech at constant volume is converted into an electrical waveform (by a telephone handset, for example) such that the signal is centered about some average or "zero" value, repeated measurements of the instantaneous amplitude of the resulting signal would show that most of the measured values would be in the neighborhood of zero. This is illustrated by the probability distribution curve shown in FIG. 1 of the drawings. More detailed data on speech probabilities may be found in an article entitled "An Experimental Study of Speech Wave Probability Distribution," by W. B. Davenport, Jr., which appeared in volume 24, No. 4 of the Journal of the Acoustical Society of America, July 1952.

Figure 2:
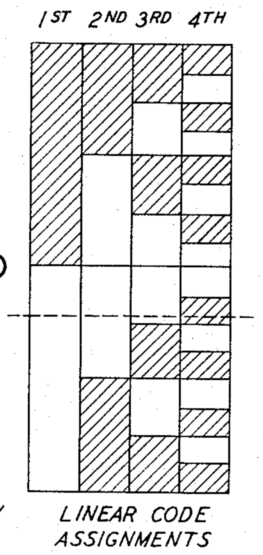

By utilizing $n$-digit code words, it is possible to indicate in which amplitude level out of the $2^n$ possible levels the signal amplitude lies. With linear coding, all of these levels are of equal size. FIG. 2 of the drawings illustrates a set of linear code assignments which may be used to designate a particular level. For example, where the signal amplitude to be encoded always lies between +16 and −16, four digits may be used, as illustrated in FIG. 2, to separate this 32 volt range into 16 different quantization levels. The code representation of a particular amplitude may be obtained by reading across the code assignment chart from left to right. On the charts of both FIGS. 2 and 3, the shaded areas represent the digit symbol "1" and the unshaded areas represent the digit symbol "0." Thus, for an amplitude level of −3.5 volts (shown by the horizontally dotted lines across FIGS. 1, 2, and 3) the linear code representation, as shown by FIG. 2, is "0001," the digits appearing in order of decreasing significance.

Figure 3:
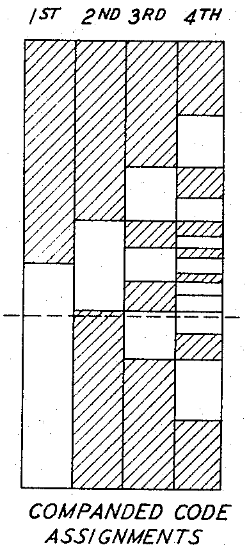
FIG. 3 shows the manner in which signal amplitudes may be represented by a companded coding scheme.

As shown by FIG. 3 of the drawings, the quantization levels for companded code assignments are of unequal size, being quite small near the "0" level. The signal amplitude level of −3.5 volts is thus represented by a different code word "0100" when the companded code assignments are used.

Figure 4:
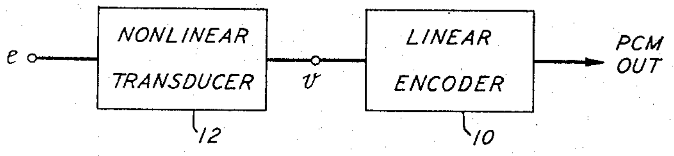
FIG. 4 PRIOR ART
FIG. 4 illustrates in simple block form the conventional companded encoder.

In order to more clearly understand the nature of the decoding process contemplated by the present invention, it will be helpful to first consider the operation of the conventional companded encoder shown in FIG. 4 of the drawings. That arrangement comprises the combination of a conventional linear encoder 10 (which uses the coding assignments shown in FIG. 2) and a nonlinear input transducer 12 having the idealized transfer characteristic shown in FIG. 5. The over-all coding arrangement depicted in FIG. 4 is capable of generating a binary code representation of the input signal in accordance with companded code assignments of the type shown in FIG. 3.

Figure 5:
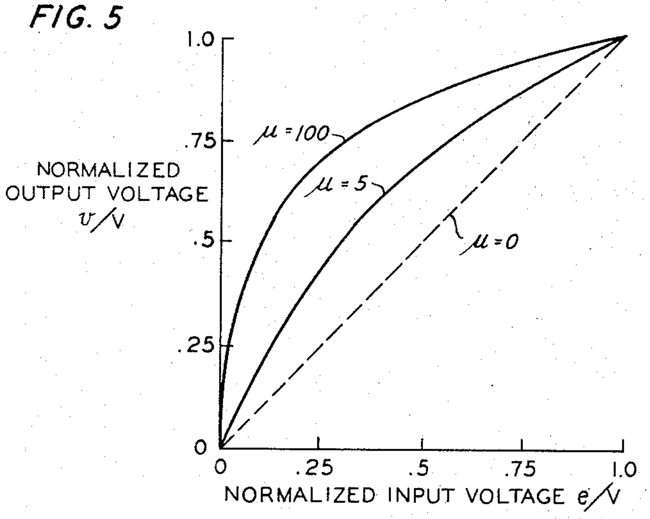
FIG. 5 shows the transfer characteristic of a nonlinear transducer necessary to provide logarithmic companding.

As may be seen from the compression characteristic of FIG. 5, the transducer 12 amplifies weak input signals more greatly than it does stronger signals. For true logarithmic companding, the output signal $v$ applied to the input of the encoder 10 should be functionally related to the input signal $e$ by the following equations:

$$v=\frac{V\ln\left(1+\frac{\mu e}{V}\right)}{\ln(1+\mu)}$$

for $e$ between 0 and +V and $$v=\frac{-V\ln\left(1-\frac{\mu e}{V}\right)}{\ln(1+\mu)}$$

for $e$ between 0 and −V.

In the relations above, +V and −V are the maximum and minimum amplitudes attained by $e$ and $\mu$ is a dimensionless parameter which determines the degree of compression. For $\mu=0$, no compression at all exists as shown by the linear dotted line of FIG. 5. Compression curves for $\mu=5$ and $\mu=100$ are also shown on FIG. 5. In FIG. 5, the symmetrical negative portion of the curves (given by the lower equation above) are not shown.

The logarithmic compresson curves shown in FIG. 5 are "idealized" in the sense that they may only be approximated by conventional passive transducer. A sequential encoder circuit capable of true logarithmic companding is, however, described in U.S. patent application Ser. No. 227,271, filed Oct. 1, 1962, by F. D. Waldhauer, now Patent No. 3,161,868. In addition, as will be discussed later in conjunction with FIG. 11 of the drawings, it is possible to utilize the decoder contemplated by the present invention in combination with other circuitry to form a true logarithmic encoder.

FIG. 6 of the drawings illustrates the decoding arrangement contemplated by the invention in simplified, block diagram form. The PCM code words which are to be decoded are fed serially (most significant digit first) to the input 15 of a shift register 16. The first and most significant digit then appears on conductor 21 while the second through the fourth digits appear on conductors 22 through 24, respectively. The illustrative decoder of FIG. 6 has a capacity of only four digits, although the decoding scheme according to the invention may be extended to any number of digits. As may be appreciated from FIG. 3, the first and most significant digit which appears on conductor 21 is indicative of the polarity of the output signal. Accordingly, the first digit is applied to operate a switching element 26 which selectively connects the output from the second stage 28 to either the input of inverting amplifier 31 or directly to the output 34. The output of amplifier 31 is connected to the decoder output terminal 34.

The second, third and fourth stages are substantially identical, differing only in the nature of their transfer characteristics. The second most significant digit (which appears on conductor 22 from the shift register 16) is applied to the digit input of the second stage 28. The third and fourth digits are applied to the digit inputs of the third stage 36 and the fourth stage 38, respectively. An initial value signal $e_1$, developed by source 40, is applied to the analog input of the fourth stage 38. The analog output signal $e_4$ from the fourth stage 38 is applied to the analog input of the third stage 36. Similarly, the analog output signal $e_3$ from the third stage 36 is applied to the analog input of the second stage 28. The signal $e_2$, which appears at the analog output of stage 28, is representative of absolute magnitude of the decoded output signal.

Illustrative transfer characteristics for stages 38, 36 and 28 are shown in FIGS. 7 through 9, respectively. The transfer characteristics of each stage is altered in response to changes in the digit symbol applied to that stage. When the digit symbol "0" is applied, the transfer character represented by a solid line segment shown in FIGS. 7 through 9 is used; the dotted line transfer character being employed when the applied digit symbol is a "1." In order to decode logarithmically companded code words into their analog equivalents, the transfer characteristics vary from stage to stage. For the $j^{th}$ stage, these characteristics are defined by the following relationships.

$$e_j=G_1e_{j+1}\qquad \text{for } D_j=\text{"0"}$$

and $$e_j=[1-G_1]e_{j+1}+G_1V\qquad \text{for } D_j=\text{"1"}$$

where $e_{j+1}$=input signal to the $j^{th}$ stage;
$e_j$=output signal from the $j^{th}$ stage;
$D_j$=digit input symbol to the $j^{th}$ stage; and $$G_1=\left[\frac{(1+\mu)^\alpha-1}{(1+\mu)^{2\alpha}-1}\right]$$

where $\mu$=degree of compression, and $$\alpha=\frac{1}{2^{j-1}}\qquad \text{for } j=2, 3, \ldots, n.$$

FIG. 10 of the drawings shows a stage circuit capable of realizing the transfer characteristics set forth in the preceding equations. The circuit includes means responsive to the binary input digit for varying the stage gain (or attenuation) as well as means for adding the fixed value signal to the output signal whenever the input digit is a particular symbol.

The circuit shown in FIG. 10 of the drawings comprises a high gain amplifier 41 having an input 42 and an output 43. The feedback resistances 45 and 46 are connected in series between the input and output of amplifier 41. The output resistor 47 is connected to amplifier output 43. The series combination of the collector-emitter path of a transistor switch 51 and a resistor 52 is connected between ground and the junction of resistances 45 and 46. The fixed value signal is added by means of a network comprising a source 54, a resistor 55 and a pair of diodes 56 and 57. The negative terminal of source 54 is grounded and the positive terminal is connected through resistor 55 and diode 57 to the amplifier input 42. Diode 56 is connected between the junction of resistor 55 and diode 57 to the digit input terminal 60. The base electrode of transistor switch 51 is also connected to terminal 60.

The input signal to the stage circuitry shown in FIG. 10 consists of two components—the first being the input current $i_{j+1}$ from the preceding stage and the other being the switched current $i_a$ from the reference source 54. Reference current $i_a$ is routed to the input 42 whenever a positive voltage indicative of a "1" is applied to digit input 60. When a negative voltage indicating a "0" is applied to digit input 60, the diode 56 conducts and diode 57 is reverse biased. As may be appreciated, the polarity of the voltage applied to terminal 60 also controls the conductivity of the transistor switch 51, which in turn controls the current gain of the stage. Switch 51 conducts for a "1" digit input and is cut off for a "0" digit input.

The resistance values for the resistors 45, 46, 47 and 52 may be preset to obtain the desired stage current gains $G_1$ and $G_2$ by means of the following relations:

$$G_1=\frac{R_{45}+R_{46}}{R_{47}}=(1-G_2)$$

$$G_2=\left(R_{45}+R_{46}+\frac{R_{45}R_{46}}{R_{52}}\right)\left(\frac{1}{R_{47}}\right)$$

where the subscripts indicate the reference numerals by which the various resistors are designated. The voltage of source 54 and the resistance of resistor 55 should also be adjusted to provide a current $i_a$ equal to the product of $$\left(\frac{G_1}{G_2}\right)$$

and the full-range stage input current. The current and resistance values for the stages are relative only—if desired, all may be multiplied by a selected scaling constant to permit the most effective operation of the circuitry employed.

Using the companded decoder described above, it is possible to add additional apparatus to form a companded coder. This technique is known to the art and is described by B. D. Smith in the article "Coding by Feedback Methods," which appears on pages 1053–1058, vol. 41, Proceedings of the I.R.E. (1953).

One such approach is shown for purposes of illustration in FIG. 11 of the drawings. The analog sample voltage to be encoded is applied to a first terminal 61 of the differential amplifier 63. The output of amplifier 63 is connected to the input of a comparator circuit 64. The PCM code words appear serially, most significant digit first, at the output 66 and are fed back to the input of a control circuit 67 which distributes the digits through respective ones of the single digit conductors 68 through 70. These single digit conductors form the digit inputs to the various stages of a companded decoder 72 of the type shown in FIG. 6 of the drawings.

Before the sample voltage applied to terminal 61 is encoded, the control circuit 67 initially applies a code word comprised entirely of "0's" as a "first guess" to the decoder 72. Decoder 72 thus delivers a zero value voltage to the second input 73 of the differential amplifier 63. The error signal appearing at the output of amplifier 63 represents the difference between the levels of the signals applied to inputs 61 and 73. The comparator 64, which is adapted to deliver an output pulse to output 66 whenever a positive input signal is applied, thus generates the first and most significant digit of the output code group, a pulse indicating a "1" and no pulse indicating a "0." Control circuit 67 then routes this first pulse via conductor 68 to the decoder 72 which forms a second "guess" of the input signal amplitude. This process of successive approximation is continued until all of the digits are formed. If parallel readout is desired, the digits may then be obtained from conductors 68 through 70.

It is to be understood that the embodiments of the invention which have been described are merely illustrative of an application of the principles of the invention. Numerous modifications may be made by those skilled in the art without departing from the true spirit and scope of the invention.

What is claimed is:

1. Apparatus for translating an *n*-digit binary code word into its analog equivalent which comprises, in combination, a source of an initial value signal and means for subjecting said initial value signal to a sequence of *n* operations, the character of a given one of said operations being dependent upon the value of the respective one of said *n* digits, said last-named means including, in combination, means for multiplying the result obtained from the operation preceding said given operation by a first factor when said respective digit is a first value and by a second factor when said respective digit is a second value, said first and said second factors having the same sign but substantially different magnitudes, and means for adding to said product signal a first reference signal when said respective digit is said first value and for adding to said product signal a second reference signal when said respective digit is said second value to form the result of said given operation.

2. Apparatus as set forth in claim 1 wherein each of said translating stages comprises, in combination, an amplifier having an input and an output, means for connecting the input of said amplifier to the analog input of said stage means for connecting the output of said amplifier to the analog output of said stage, a feedback path connected between the input and the output of said amplifier, means for altering the impedance of said feedback path in response to changes in the value of the digit applied to the digit input of said stage, and means for adding a constant value signal to the signal appearing at said analog output whenever the digit applied to said digit input is said second value.

3. Apparatus for decoding a multiple digit binary code word which comprises, in combination, a plurality of signal translating stages each having an analog input, an analog output and a digit input, means for connecting said stages in cascade, the analog output of one stage being connected to the analog input of the following stage, means included within each stage for multiplying the signal amplitude appearing at said analog input by a first factor when the digit signal applied to said digit input is a first value and by a second factor when said digit signal is a second value, said first and said second factors having the same sign but substantially different magnitudes, means for adding to the signal thus amplified a first reference signal when the digit applied to said digit input is said first value and a second reference signal when the digit applied to said digit input is said second value, said first and said second reference signals having substantially different magnitudes, and circuit means for applying the sum signal formed by said last-named adding means to the analog output of said stage.

4. Apparatus as set forth in claim 3 wherein said means included within each stage for multiplying comprises, in combination, an amplifier having an input and an output, circuit means for connecting said anolog input to the input of said amplifier, at least one feedback path connected between the input and output of said amplifier and means responsive to changes in the value of the digit applied to said digit input for altering the transfer gain of said feedback path.

References Cited

UNITED STATES PATENTS

| | | | |
|---|---|---|---|
| 3,259,896 | 7/1966 | Pan | 340—347 |
| 3,264,637 | 8/1966 | Parkinson | 340—347 |
| 3,276,009 | 9/1966 | Honore et al. | 340—347 |
| 3,283,319 | 11/1966 | Kaneko | 340—347 |
| 3,296,611 | 1/1967 | Kaneko | 340—347 |
| 3,305,855 | 2/1967 | Kaneko | 340—347 |

MAYNARD R. WILBUR, *Primary Examiner.*

DARYL W. COOK, *Examiner.*

W. KOPACZ, *Assistant Examiner.*